United States Patent [19]

Schuurman

[11] Patent Number: 4,540,547

[45] Date of Patent: Sep. 10, 1985

[54] MOVING BED REACTOR

[75] Inventor: Pieter J. Schuurman, The Hague, Netherlands

[73] Assignee: Shell Oil Company, Houston, Tex.

[21] Appl. No.: 627,506

[22] Filed: Jul. 9, 1984

Related U.S. Application Data

[63] Continuation of Ser. No. 390,452, Jun. 21, 1982, abandoned.

[30] Foreign Application Priority Data

Jun. 30, 1981 [GB] United Kingdom ................. 8120176

[51] Int. Cl.$^3$ ................................................ B01J 8/12
[52] U.S. Cl. ..................................... 422/49; 422/216; 422/213
[58] Field of Search ................. 422/49, 216, 219, 213, 422/191, 192

[56] References Cited

U.S. PATENT DOCUMENTS

| | | | |
|---|---|---|---|
| 2,483,948 | 10/1949 | Underwood | 422/49 |
| 2,820,702 | 1/1958 | James | 422/219 |
| 3,758,279 | 9/1973 | Whitesides | 422/192 |
| 3,883,312 | 5/1975 | Youngman | 422/212 |
| 4,040,794 | 8/1977 | Stone | 422/216 |
| 4,179,399 | 12/1979 | Lichtenberger et al. | 422/216 |
| 4,314,967 | 2/1982 | Kwon et al. | 422/49 |
| 4,357,304 | 11/1982 | Pegels et al. | 422/216 |
| 4,446,112 | 5/1984 | Hartog | 422/216 |

Primary Examiner—Tim Miles

[57] ABSTRACT

A moving catalyst bed reactor is disclosed, the reactor being provided with conical catalyst bed support means and independently laterally displaceable screen sections which provide for separation of the catalyst and the effluent.

12 Claims, 5 Drawing Figures

4,540,547

MOVING BED REACTOR

This is a continuation of application Ser. No. 390,452, filed June 21, 1982, now abandoned.

BACKGROUND OF THE INVENTION

The present invention relates to a moving catalyst bed reactor for the catalytic treatment of hydrocarbons, particularly the catalytic desulphurization and demetallization of petroleum residues.

Moving catalyst bed reactors are known, e.g., as described in U.S. Pat. No. 3,883,312, issued May 13, 1975, by Youngman, which disclosure is incorporated herein by reference. According to the patent, both the used solid catalyst and the reactor effluent are removed from a moving catalyst bed reactor through the same withdrawal conduit. The reactor effluent leaves the conduit through the openings of a circumferential screen section in its wall. The catalyst descends past the openings and is washed by an upward moving oil which leaves the conduit through the same openings.

In recent years there is a tendency to carry out processes of the kind mentioned on an ever increasing scale. However, this scale-up to large capacities creates problems in the construction and design of the reactors. One such problem is that the diameter of the vertical outlet channel must be increased to allow the larger mass of catalyst to pass the channel. As a consequence, the diameter of the circumferential screen section must be increased, thereby complicating the manufacture and installation of the screen section. Furthermore, enlargement of the diameter of the cylindrical screen section will soon lead to the problem that the screen section as a whole can no longer be removed from the interior of the vessel through the normally available manholes in the reactor wall. This means, that, for repair or replacement of the screen section, it is necessary to split the screen section into a number of parts, or to dismantle the reactor, both of which are time-consuming operations.

A further consequence of the growing tendency to carry out catalytic treating processes on an increased scale is the fact that the screen sections in the outlet channels of the reactors must withstand ever increasing loads both in horizontal and vertical directions. In at least some prior art moving catalyst bed reactors, the screen sections in the vertical channels form an integral part of the vertical channels, and must therefore withstand the load of the catalyst. This means that in these moving catalyst bed reactors the size and number of the openings in the screen sections are to be reduced or extra reinforcing means are to be applied to obtain the required resistance of the screen sections against increasing loads. Reducing the size and/or number of openings has an adverse influence on the separating efficiency of the vertical outlet channels. Accordingly, it is an object of the invention to overcome these difficulties.

SUMMARY OF THE INVENTION

Accordingly, the invention relates to a moving catalyst bed reactor comprising a normally vertically extending, preferably cylindrical, vessel having separate inlets for reactant and catalyst at the upper part of the vessel, catalyst bed support means including a first downwardly converging conical surface, the lower end thereof being connected to vertical channel means having a circumferential wall for the passage of catalyst and separation of reactor effluent, the channel means terminating in and communicating with a second downwardly converging conical surface, and the circumferential wall being provided with a screen section for the withdrawal of the reactor effluent. According to a main feature of the invention, the screen section is vertically divided into a plurality of separate screen segments, each separate screen segment being laterally displaceable without displacement of the other screen segments.

In a preferred embodiment of the invention, the screen segments are each flat. The screen segments can easily be installed in an existing reactor without the necessity of dismantling the whole reactor. Further, such screen segments, especially when they are flat, can be manufactured in a simple manner.

The invention further resides in measures for reducing the loads on the screen section during operation of the reactor. For absorbing the horizontal load on the screen section in a vertical channel of a moving catalyst reactor of the type described, the screen segments are preferably supported in lateral outward direction by supporting elements. For absorbing the vertical load on the screen segments, the supporting elements preferably form part of a support structure secured to the downwardly converging conical surface arranged above the channel, said support structure being further attached to at least the part of the channel arranged below the screen segments. By this arrangement, not only the screen segments but also the part of the vertical channel above the screen segments are relieved. As an alternative, the support structure may be secured to the channel at a level above and a level below the screen segments. By this arrangement, the vertical load on the lower part of the channel below the screen segments is transmitted via the support structure to the part of the channel above the screen segments. This last arrangement is suitable at moderate vertical loads, whereas the first mentioned arrangement is particularly suitable at high vertical loads.

DETAILED DESCRIPTION OF THE DRAWING

The invention will now be described with reference to the accompanying drawing.

Figure 1:
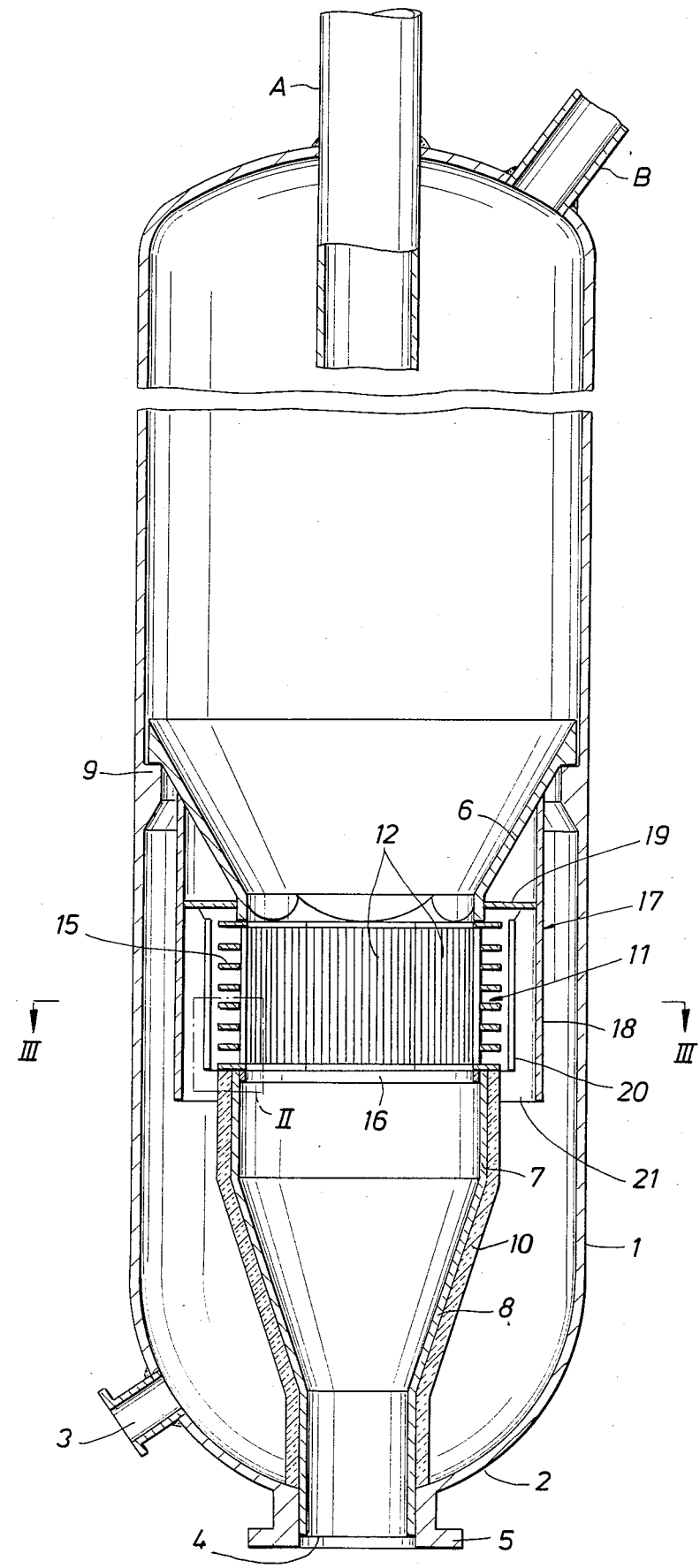
Figure 2:
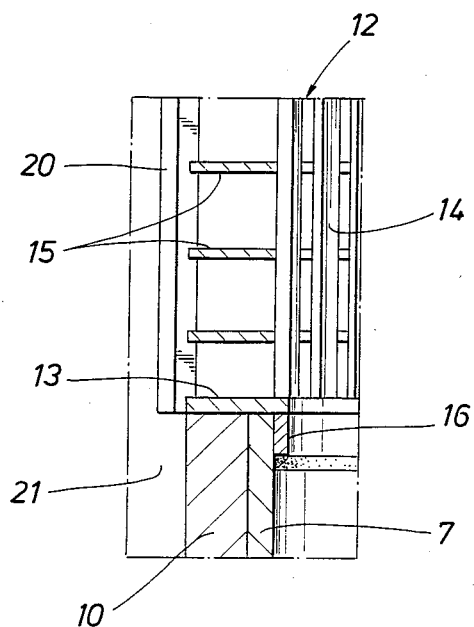
Figure 3:
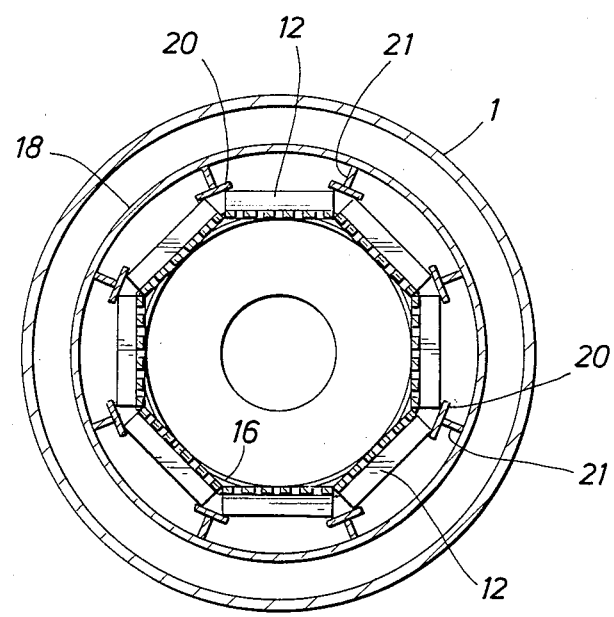
Figure 4:
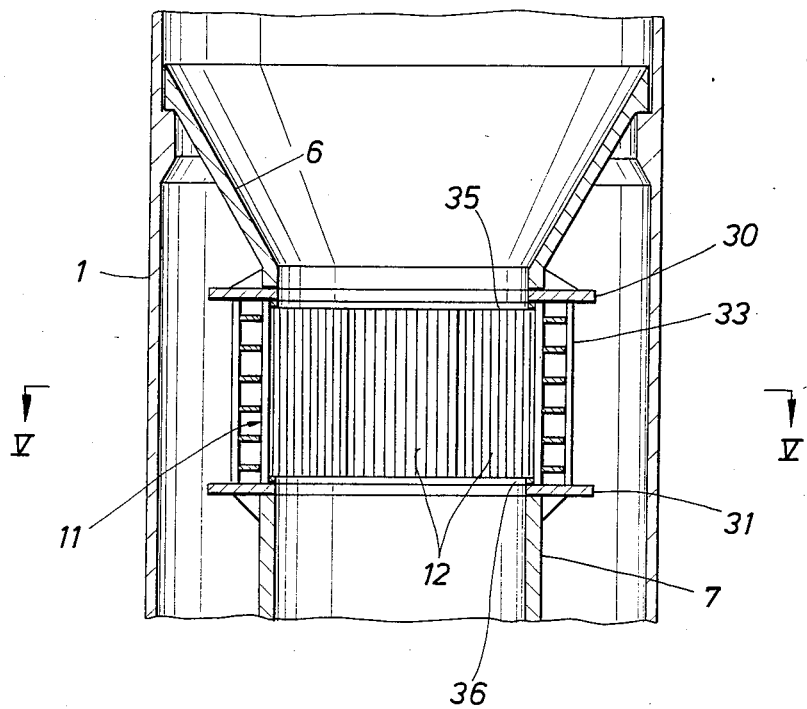
Figure 5:
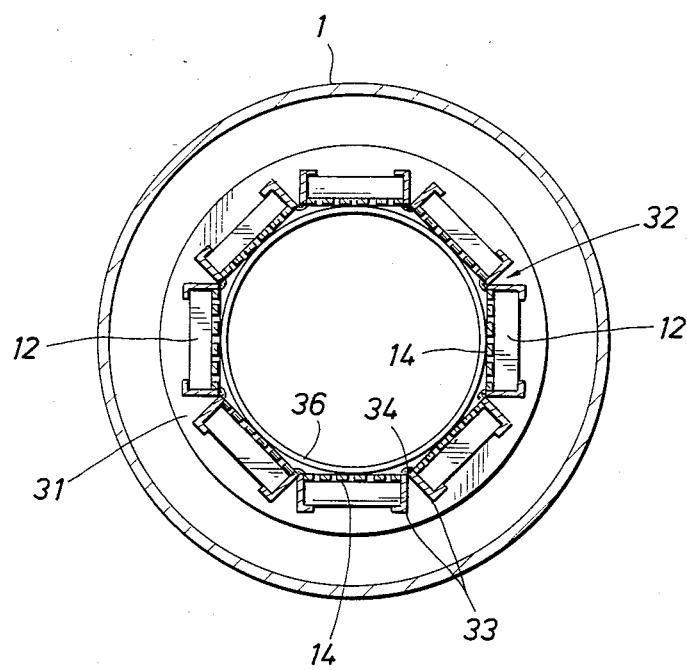

FIG. 1 schematically illustrates a longitudinal cross section of a part of a reactor according to the invention, FIG. 2 illustrates detail II of FIG. 1 on larger scale, FIG. 3 schematically illustrates cross section III—III of FIG. 1, FIG. 4 schematically illustrates a longitudinal cross section of an alternative embodiment according to the invention, and FIG. 5 schematically illustrates cross section V—V of FIG. 4.

Similar parts in the embodiments shown in the figures have been identified by the same reference numerals.

More particularly, FIG. 1 illustrates a normally vertically extending reactor according to the invention comprising the reactor side wall (1) and the bottom reactor head (2). The bottom reactor head (2) is provided with a reactor effluent outlet nozzle (3), a catalyst withdrawal pipe (4) including a catalyst unloading nozzle (5). The reactor is internally provided with supporting means for supporting the catalyst, said supporting means including a downwardly converging conical surface (6) terminating at the lower end thereof in a vertical outlet channel (7) for the passage of catalyst and reactor effluent. In this illustration, the angle with the vertical axis of the conical surface (6) is about 20°.

To direct the catalyst from the channel (7) towards the catalyst withdrawal pipe (4), a second lower cone segment (8) is arranged between the lower end of the outlet channel (7) and the upper end of the catalyst withdrawal pipe (4). The angle with the vertical axis of the lower cone segment (8) should be such that the catalyst can smoothly pass this segment (8) towards the catalyst withdrawal pipe 4.

The conical surface (6), the channel (7), and the lower cone segment (8) are supported by cone supports (9) at the inner surface of the reactor wall (1). The walls of the channel (7), the lower cone segment (8) and the catalyst withdrawal pipe (4) are provided with an insulating layer (10). The vertical channel (7) is provided with a screen section (11), for separating the reactor effluent, which passes through the screen section, from the catalyst, said screen section (11) being arranged circumferentially in the channel (7).

As more clearly shown in FIG. 3, the screen section (11) comprises a plurality of separate, flat screen segments (12). The number of screen segments (12) depends on the diameter of the channel (7), as well as on the diameter of the opening, not shown, for example, a manhole, for introducing the screen segments (12) into the reactor. To form the screen section (11), at least three flat shaped screen segments (12) should be applied. As shown in FIG. 2, each screen segment (12) consists of a framework (13) provided with vertical bars (14) and horizontal reinforcing bars (15). The width of the slot opening between adjacent vertical bars (14) is so chosen that catalyst cannot pass through the screen segments (12). For installation purposes, the height of the opening in the wall of the vertical channel (7) is chosen slightly larger than the height of said screen segments (12). Once installed in the channel (7) the screen segments (12) are locked in place by arranging a locking strip (16) at the upper end of the lower portion of channel (7). The locking strip (16) is welded to the wall of the channel (7). Although not necessary, the screen segments (12) may be spot welded to the wall of the channel (7) and the locking strip (16) extending below the upper end of the lower portion of channel (7). The screen section (11) is encompassed by a support structure generally indicated by reference number (17). The support structure (17) comprises a stiffening cylinder (18) secured at the upper end thereof to the conical surface (6) by means of welding. A stiffening ring (19) is arranged between the stiffening cylinder (18) and the channel (7). The screen segments (12) are supported in lateral outward direction by a number of supporting elements formed by brackets (20) forming part of the support structure (17). The number of brackets (20) equals the number of screen segments (12). The brackets (20) are so arranged that each bracket (20) supports two adjacent screen segments (12). Between each bracket (20) and the stiffening cylinder (18) a bracket (21) is arranged. The brackets (21) are secured to the stiffening ring (19) and the lower part of the channel (7) by means of welding.

During operation of the reactor, partly shown in FIG. 1, catalyst and reactant are supplied into the upper part of the interior of the reactor, e.g., through inlets or pipes A and B, respectively. Other internals of the reactor, if any, are not shown. Having passed the conical surface (6), the catalyst and reactor effluent enters the outlet channel (7) where the reactor effluent is separated from the catalyst via the screen section (11). The reactor effluent and catalyst thereby exert lateral forces on the screen segments 12. These lateral forces are taken up by the stiffening cylinder (18) via the brackets (20) and (21). The catalyst moves downwardly through the channel (7) and via the interior of the lower cone segment (8) into the catalyst withdrawal pipe 4. The axial downward forces exerted by the catalyst and the lower cone segment (8) on the outlet channel (7) are transmitted via the brackets (21) and the stiffening cylinder (18) to the conical surface (6). By this arrangement, the screen segments (12) are not subject to high axial loads. As a consequence thereof the size and number of openings in the screen segments can be so chosen that an optimal reactor effluent removal is possible. In view of the above, the screen segments (12) can further be made relatively light, which has a positive influence on the cost of the screen segments (12). Finally, since the screen segments (12) do not form part of the support for the lower cone segment (8), all the screen segments (12) can simultaneously be removed from the outlet channel (7) without the necessity of temporarily supporting the lower cone segment 8 by special means.

For absorbing the differences in expansion between the internal construction of the reactor and the wall of the reactor the catalyst withdrawal pipe (4) is slideably arranged in the catalyst unloading nozzle (5).

Reference is now made to FIGS. 4 and 5 showing a second embodiment of the invention. Similar parts as described in connection with FIGS. 1, 2 and 3 have been identified by the same reference numerals. The channel (7) of the reactor partly shown in FIG. 4 is provided with annular collars (30) and (31). The collars are interconnected by means of a plurality of support elements consisting of wedge-like structures (32), thereby forming a support structure for the screen section (11) and the part of the outlet channel (7) arranged below the screen section (11). The number of wedge-like structures (32) is chosen equal to the number of screen segments (12) to be applied.

As shown in FIG. 5, each wedge-like structure (32) comprises two angle sections (33), being interconnected by means of a weld (34). The distance between each pair of adjacent wedge-like structures (32) is chosen that a screen segment (12) fits between a pair of adjacent structures (32). Displacement of the screen segments (12) in lateral outward direction is prevented by the tangential sides of the angle sections (33). Although not necessary, the screen segments (12) may be spot-welded to the collars (30) and (31) after installation. The screen segments (12) are locked in position by two locking strips (35) and (36) arranged at the inner parts of the collars (30) and (31), respectively. The locking strips (35) and (36) are secured to the collars (30) and (31) respectively, by means of welding. For maintenance and/or repair work of the screen segments (12), the locking strips (35) and (36) are first removed from the collars (30) and (31) respectively, whereafter the screen segments (12) can be easily displaced.

Vertical forces on the lower part of the channel (7) are transmitted via the wedge-like structures (32) to the upper part of the outlet channel (7). An advantage thereof resides herein that for removal of the screen segments (12) the lower part of the outlet channel (7) does not need to be temporarily supported by special means. Further, the above support structure enables a relatively light and therefore cheap construction of the screen segments.

Although the embodiments shown in the Figures comprise support structures for the screen segments, the present invention is not restricted to the application of such support structures. In case the loads on the internals of the reactor are rather moderate, the screen segments themselves may form part of the support structure supporting the part of the outlet channel (7) arranged below the screen section (11). This may be obtained by firmly securing the screen segments (12) to the parts of the wall of the outlet channel (7) arranged above and below the screen section (11).

The invention is not restricted to flat screen segments (12). Curved or arcual screen segments may also be used.

Finally, combinations of the design features of the embodiments shown in the figures may be used. For example, the wedge-like structures (32) in the embodiment shown in FIGS. 4 and 5 may be used in the embodiment shown in FIGS. (1), (2) and (3) instead of the supporting brackets (20).

I claim:

1. A moving catalyst bed reactor comprising
a vertical vessel having separate inlets for reactant and solid catalyst in the upper portion of the vessel, both of said inlets communicating with a contact space in said vessel;
catalyst bed support means defining, with the walls of the vessel, a portion of the contact space in the lower portion of the vessel, said support means comprising a first downwardly converging conical surface having an opening in the lower end thereof, vertical channel means communicating, at one end thereof, with said opening, said channel means terminating in and communicating, at the other end thereof, with a second downwardly converging conical surface having an opening in the lower portion thereof, said channel means radially communicating through a plurality of independently laterally displaceable vertical screen sections therein with a fluid effluent outlet;
and an outlet for catalyst communicating with the opening in the lower end of the second downwardly converging conical surface.

2. The reactor of claim 1 wherein means are provided for locking the screens in place.

3. The reactor of claim 1 wherein the screen segments are supported in a lateral outward direction by supporting elements.

4. The reactor of claim 3 wherein the supporting elements form part of a support structure secured to the first downwardly converging conical surface and at least that part of the channel means below the screen sections.

5. The reactor of claim 4 wherein the support structure comprises a cylindrical wall surrounding the screen section and has the upper end thereof secured to the first downwardly converging conical surface.

6. The reactor of claim 4 wherein the screen segments are each curved.

7. The reactor of claim 4 wherein the screen segments are each flat.

8. The reactor of claim 7 wherein means are provided for locking the screens in place.

9. The reactor of claim 3 wherein the supporting elements form part of a support structure secured to the channel means at a level above and at a level below the screen segments.

10. The reactor of claim 9 wherein the screen segments are each curved.

11. The reactor of claim 9 wherein the screen segments are each flat.

12. The reactor of claim 11 wherein means are provided for locking the screens in place.

* * * * *